United States Patent [19]
Gillespie et al.

[11] Patent Number: 5,805,688
[45] Date of Patent: Sep. 8, 1998

[54] AUTOMATED SYSTEM AND METHOD FOR CALL HANDLING

[75] Inventors: Donald E. Gillespie; Gregory W. Bruening, both of Boulder; Madhav V. Apte, Longmont, all of Colo.

[73] Assignee: U.S. West Advanced Technologies, Inc., Boulder, Colo.

[21] Appl. No.: 541,713

[22] Filed: Oct. 10, 1995

Related U.S. Application Data

[63] Continuation-in-part of Ser. No. 41,733, Apr. 1, 1993, abandoned.

[51] Int. Cl.⁶ ............................................. H04M 3/42
[52] U.S. Cl. ..................... 379/220; 379/142; 379/207; 379/265
[58] Field of Search ................................... 379/220, 221, 379/210, 211, 212, 201, 207, 127, 94, 265, 266, 243, 142

[56] References Cited

U.S. PATENT DOCUMENTS

| | | | |
|---|---|---|---|
| 5,506,897 | 4/1996 | Moore et al. | 379/211 |
| 5,588,048 | 12/1996 | Neville | 379/211 |

OTHER PUBLICATIONS

Telecommunications Alert Newsletter entitled "AT&T, Domino's Pizza Test Automatic Store Locator Service" Oct. 1991, vol. 9, No. 10.

*Primary Examiner*—Ahmad F. Matar
*Attorney, Agent, or Firm*—Brooks & Kushman P.C.

[57] ABSTRACT

A system and method for automatically routing telephone calls to a subscriber selected from a group of subscribers having a common calling number. The system and method are directed for use in a local exchange portion of an Advanced Intelligent Network (AIN). A database in electrical communication with the system is operative to store a plurality of user calling numbers and corresponding location data as well as a unique destination number for each of the subscribers and corresponding unique location data. A service control point or adjunct processor in electrical communication with the database processes the call handling request signal to select one of the destination numbers to route the call to. The processing requires determining the user calling number from the call handling request signal, determining the user location data and comparing the user location data to the appropriate subscriber location data to select a corresponding destination number.

16 Claims, 3 Drawing Sheets

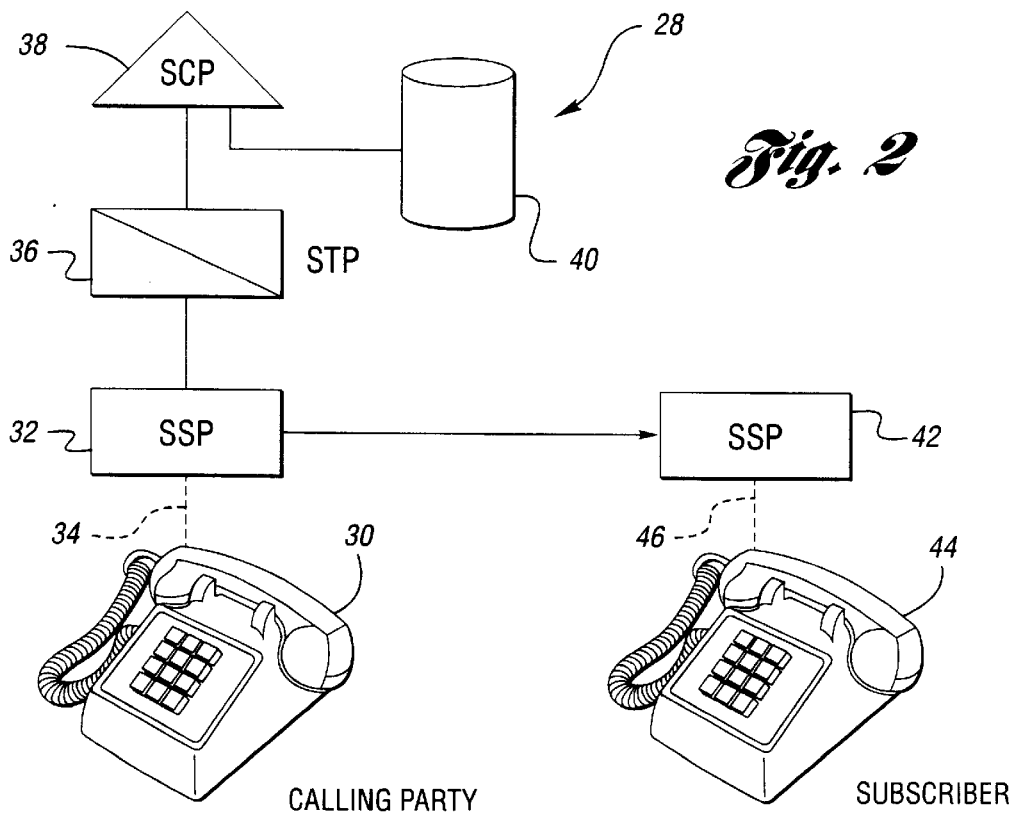

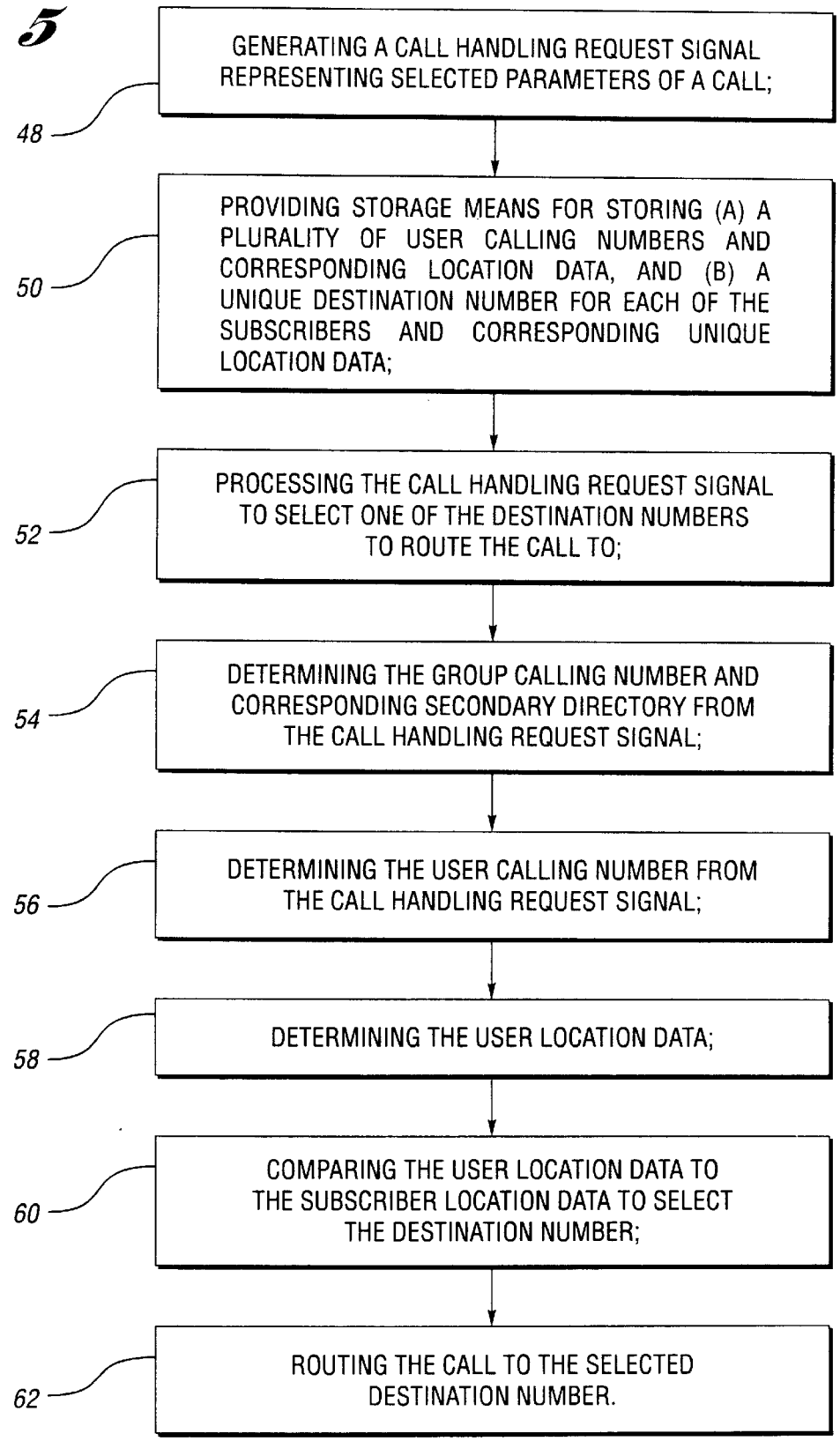

AUTOMATED SYSTEM AND METHOD FOR CALL HANDLING

CROSS REFERENCE TO RELATED APPLICATION

This application is a continuation-in-part of U.S. patent application Ser. No. 08/41,733, entitled "Apparatus And Method For Automatically Routing Telephone Calls To A Plurality Of Secondary Parties Having A Single Calling Number," filed Apr. 1, 1993 (now abandoned). The '733 application has, at all times relevant hereto, been commonly owned with the present application.

TECHNICAL FIELD

This invention relates to an apparatus and method for automatically routing a telephone call from a calling party to a subscriber selected in accordance with predetermined criteria from a group of subscribers having a common calling number.

BACKGROUND ART

Those skilled in the art will appreciate the need for a reliable and inexpensive system and method for connecting a telephone user (calling party) to one of a plurality of providers (subscribers) of desired goods or services. For example, U.S. Pat. No. 3,614,328 discloses an automatic answering service in which the calling party, after making a telephone connection with a data center, can dial additional digits which cause the user to be provided with information concerning the desired goods or services. That system also includes as a feature the ability of the user to select files within a predetermined geographic area of the user's calling station.

Similarly, U.S. Pat. No. 4,577,062 discloses a system in which stock information can be accessed concerning a specific stock based upon a sequence of digits dialed by the user. As disclosed, the system also provides for the ability to invite the user to enter a pre-arranged sequence of digits so as to connect the user to a participating broker.

See also Reissued No. B1 4,757,267 which discloses a telephone system for connecting a calling party to a dealer or service organization selected according to the shortest geographic distance from the calling party. In operation, the calling party is prompted to make Dual Tone Multi-Frequency (DTMF) entries to identify products or services of interest. Once a desired product or service is identified, call routing decisions are made by cross-referencing the calling party's telephone number (the NPA-NXX code) to a corresponding Vertical/Horizontal V/H coordinate system.

The routing technique used in the '267 patent is similar to that used by Local Exchange Carriers (LEC) for emergency services. E-911 calls, for example, are generally organized in accordance with off-line generated databases which correspond to NPA-NXX numbering and/or street mapping. These systems, however, are highly prone to human and mechanical error because of ambiguities arising from similar street names and addresses. Off-line generated databases are also known be difficult to modify since information must be continuously recalculated as users change their address.

See also, U.S. Pat. No. 5,095,505 which discloses a customer-specific call processing system for interexchange networks which uses special numbers, i.e. service access codes such as "800" or "900" numbers.

Finally, see U.S. Pat. No. 5,046,088 which discloses an apparatus for converting in-band signalling information, such as AIN.

DISCLOSURE OF THE INVENTION

It is an object of the present invention to overcome the limitations of the prior art by providing a system and method for automatically routing a telephone call from a calling party to a subscriber selected in accordance with predetermined criteria from a group of subscribers having a common calling number.

A more specific object of the present invention is the provision of a system and method for automatically routing a telephone call in a local exchange portion of an Advanced Intelligent Network (AIN) from a calling party to a selected subscriber, in cooperation with an adjunct processor and specially adapted storage means.

In carrying out the above-stated objects and other objects, features and advantages of the present invention, there is provided an automated system and method for call handling. The system and method are directed for use without user prompting in a local exchange portion of an Advanced Intelligent Network (AIN) having a plurality of subscribers, each of which is assigned a common calling number and a unique destination number.

In accordance with the invention, signal generation means is utilized for generating a call handling request signal representing selected parameters of a call. The signal generation means is preferably, but not necessarily, located within or proximate a Service Switching Point (SSP), sometimes also called a central office switch. The call handling request signal comprises a query launched to a processor such as a Service Control Point (SCP). The signal typically includes at least a user calling number and may further include the day and time of the user's call.

Storage means is provided in electrical communication with the processor as is adapted to store a plurality of user calling numbers and corresponding location data. The location data may include, for example, the user's zip code, census grid code, etc. The storage means is further adapted to store a unique destination number for each of the subscribers as well as corresponding unique location data. The location data may include, for example, one or more zip codes or one or more census grid codes.

In a preferred embodiment, the above described location data may be stored as first and second directories. The first directory may include a plurality of user calling numbers and corresponding location data, i.e., a corresponding zip code, census grid code, etc. The second directory may include selected groupings of subscriber location data, i.e., one or more zip codes, census grid codes, etc., and corresponding destination numbers. The destination numbers may be assigned to the location data groupings in accordance with day, time or other predetermined subscriber preferences.

In keeping with the invention, the processor, typically an SCP, processes the call handling request signal to select one of the destination numbers to route the call to. The processor comprises means for determining the user calling number from the call handling request signal, means for determining the user location data and means for comparing the user location data to the appropriate subscriber location data to select the destination number. In the preferred embodiment, wherein calling day and calling time information is included in the call handling request signal, the processor further includes means for comparing the day of call and time of call to subscriber location data.

Finally, routing means is provided for routing the call to the selected destination number. In keeping with the invention, the signal generation means, storage means, processing means and routing means and their corresponding functions of generating, storing, processing and routing are all performed via components of the AIN.

The above described objects, features and advantages of the present invention are readily apparent from the following detailed description of the best modes for carrying out the invention when taken in connection with the accompanying drawings.

BRIEF DESCRIPTION OF THE DRAWINGS

FIG. 2 is a block diagram of the preferred embodiment of the system of the present invention;

FIGS. 3–4 are schematic diagrams of the directory architecture of the present invention; and FIG. 5 is a flow diagram of the method of the present invention.

BEST MODE FOR CARRYING OUT THE INVENTION

Figure 1:
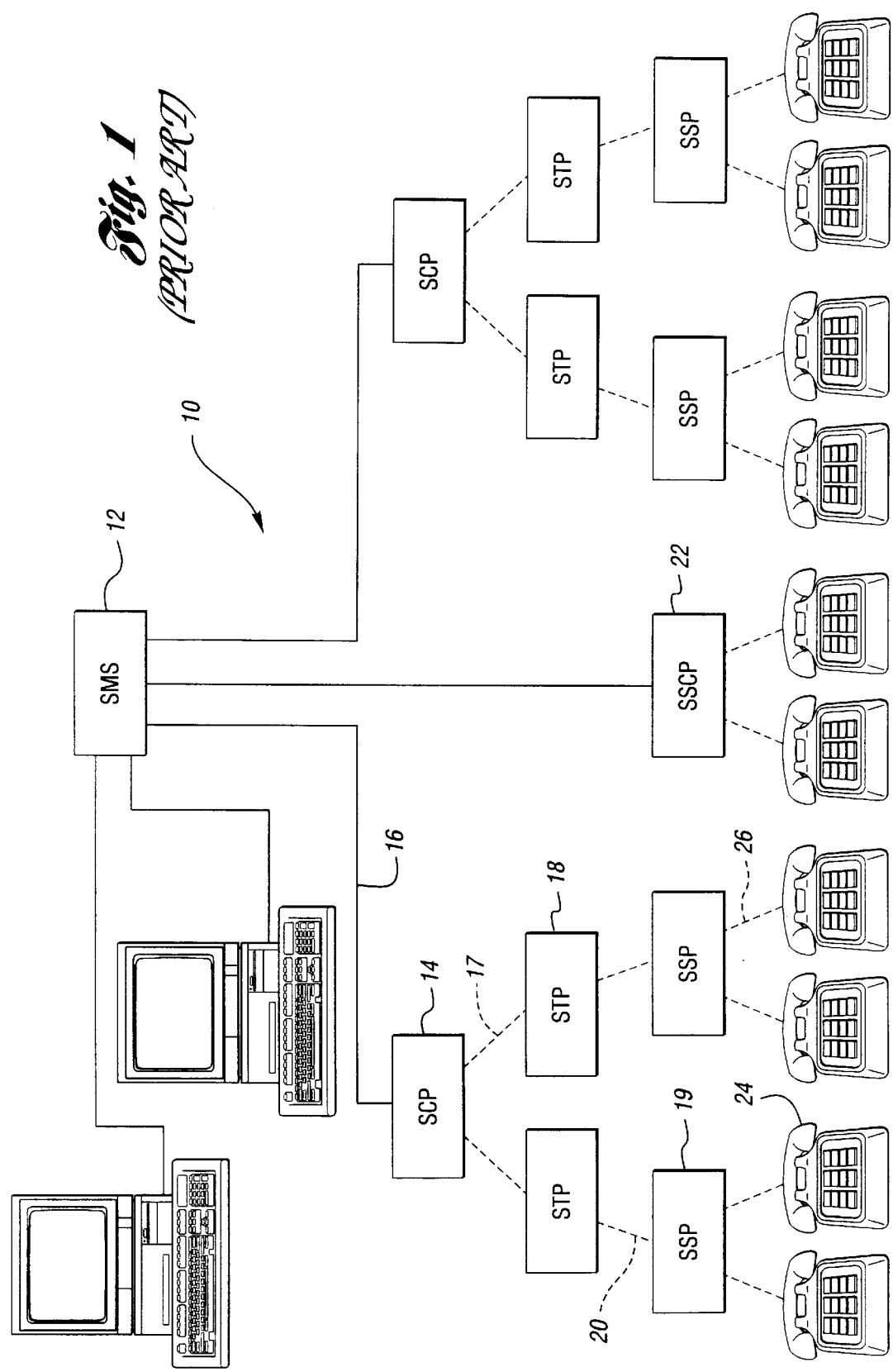
FIG. 1 is a representative diagram of an Advanced Intelligent Network (AIN)

With reference to FIG. 1 of the drawings, a representative diagram of Advanced Intelligent Network (AIN) architecture is disclosed for use in a public Switched Telephone Network (PSTN). The AIN architecture referred to is designated generally by reference numeral 10. Network architecture 10 is implemented with common channel Signaling System No. 7 (SS7) protocol. Designed to be used primarily in high-speed digital networks, Common Channeling Signaling System No. 7 is capable of controlling low-speed analog facilities as well. SS7 generally operates at 64 kbPS and can support variable message links up to 2,176 bits (272 octets) of information per message.

The SS7 network is comprised of various packet switching elements and transmission links, some of which are shown in network architecture 10. Service Management System (SMS) 12 generally comprises a computer based system used to design service logic, to control logic implementation to the network, and to manage the network operation, such as monitoring traffic levels and collecting statistics and billing data. SMS 12 is provided in electrical communication with a plurality of Service Control Points (SCP)/adjuncts 14 via management links 16. AIN service control points 14 are nodes which contain the service logic and associated data support to execute the required customer services.

Still further, there is provided Signal Transfer Points (STP) 18 in electrical communication with SCP/adjunct via signaling links 17. Service Transfer Points 18 are packet switches used to route signaling messages within the network. Service Switching Points (SSP) 19 are also provided. SSP's 19 are generally nodes (usually the subscribers local switch/central office switch) that recognize the "triggers" used when a subscriber invokes an intelligent network service and then communicates with the SCP 14 to operate the service.

As shown, SSP's 19 are provided in electrical communication with STP's 18 via signalling links 20. In limited traffic situations, Service Switching and Control Points (SSCP's) 22 may also provide for combining the functions of SCP 14 and SSP 19. Finally, subscribers 24 are provided, each having at least one Customer Premises Equipment (CPE) device such as a facsimile machine, voice messaging peripheral, modem or the like. CPE devices 24 are provided in electrical communication with SSP's 19 via signalling links 26.

The AIN architecture referenced above is known to those skilled in the art to permit services to be extended throughout the network, and particularly, in the Local Exchange portion (LEC), thereof. New services are typically installed on two SCP processing platforms for directly servicing a selected market. In operation, this service management system extends management and control to the remote Service Control Points/adjuncts via a signalling network.

Turning now to FIG. 2 of the drawings, the preferred embodiment of the system of the present invention is shown designated generally by reference numeral 28. As seen, system 28 is provided for use in the local exchange portion of a Public Switched Telephone Network (PSTN) provisioned for use with Advanced Intelligent Network (AIN) architecture. Accordingly, there is provided at least one calling party or "user" telephone 30 provided in electrical communication with Service Switching Point (SSP) 32 (commonly referred to as a central office switch) via signaling link 34. As shown in the preferred embodiment, SSP 32 is further provided in electrical communication with Signal Transfer Point (STP) 36 having Signaling System No. 7 linkages. In turn, STP 36 is provided in electrical communication with Service Control Point (SCP)/adjunct 38. Still further, SSP 32 is provided in electrical communication with subscriber 44. The connection may either be direct or via the subscriber's own SSP (central office) 42 via signalling link 46.

SCP/adjunct 38 is provided in electrical communication with a database 40 for storing a plurality of user calling numbers i.e., telephone numbers and corresponding unique location data. Such data may include, for example, the user's zip code, census grid code, etc. As those skilled in the art will recognize, the zip code is a number assigned by the U.S. postal delivery system, as part of the Zone Improvement Plan (Z & I & P) of 1963 to specifically identify each postal delivery area in the United States. A census grid code is similarly a code assigned by the U.S. Census Bureau to more particularly identify each geographic area of the United States for census reporting purposes.

This information may be stored in database 40 in the form of a first or primary directory such as that shown in FIG. 3. In the directory illustrated, calling numbers are stored for each of the users A–C along with a corresponding zip code. As shown, user "A" with calling number (telephone number) (303) 541-6236 is assigned zip code 80303-7211. Similarly, user "B" having calling number (303) 541-4000 is assigned zip code 80303-7214, and so on.

In keeping with the invention, each of the subscribers, i.e. providers of goods or services, is assigned a unique destination number and further assigned to a predetermined calling group having a unique group calling number. Thus, in addition to the first or primary directory, database 40 further functions to store at least one and preferably a plurality of secondary directories, each of which is assigned one of the group calling numbers and comprises predetermined groups of unique location data with each group assigned one or more subscriber destination number. The location data may include, for example, one or more zip codes or one or more census grid codes.

A representative secondary directory corresponding to group calling number NPA-NXXX (Company X) is shown in FIG. 4. The directory comprises a predetermined group of unique location data each assigned at least one corresponding destination number. The location data shown is zip code information and each subscriber in the Company X calling group is assigned one or more zip codes as part of its service area.

If more than one destination number is assigned, further routing information such as calling day and calling time may be provided to make the routing determination. For example, group 1 is assigned two destination numbers. The first destination number (303) 441-1111 is assigned as the proper routing preference for the hours 9 a.m. to 5 p.m. At all other times, the group 1 zip codes are assigned destination number (303) 441-1250. In the example shown, the first and second routing preferences of group 1 are implemented seven days a week. As readily seen, however, various destination numbers can be assigned in accordance with predetermined day and time preferences. Thus, a group of zip codes or other location data may be assigned a certain destination number for selected hours during the work week Monday through Friday, different destination numbers after hours on Monday through Friday and one or more alternative destination numbers for various time slots on the weekend. As shown, more than one destination number may also be assigned to a given time slot as a supplemental routing preference if a destination number with a high priority assignment is not idle.

Operation

With reference now to FIG. 3–5, the operation of the system of the present invention may be described in further detail. At the threshold, it should be understood that the system is truly automatic in that no PSAP or prompting information is required for routing the call. The processing steps are performed by the Service Switching Point (SSP)/central office switch which forwards and receives control signals to and from the SCP/adjunct processor.

A calling party or "user" who desires to contact a business or service provider will initiate a telephone call by dialing the subscriber's assigned calling number. With reference to FIGS. 3 and 4, user "A" having calling number (303) 541-6236 and zip code 80303-7211 may dial group calling number NPA-NXXX in order to order a product from company X. When the call is received by the user's SSP 32, a query, i.e. a call handling request signal, is generated for receipt by SCP 38. The call handling request signal represents selected parameters of the call, including, for example, the group calling number (NPA-NXXX), the user's calling number (541-6236) as determined through Automatic Number Identification (ANI) as well as day and time of the call, where applicable. Upon receipt of the call handling request signal, SCP 38 processes the same via reference to database 40 which contains the aforementioned subscriber and calling party location data and assigned destination numbers.

More particularly, the group calling number will be determined and the corresponding secondary directory for Company X will be located. At about the same time, the user's calling number (303) 541-6236) will be determined and compared to the primary directory to locate the user's assigned zip code (80303-7211). Thereafter, the user's zip code will be compared to the secondary directory and the predetermined groupings thereof to make a further determination of the assigned destination number. In the example shown in FIG. 4, the destination numbers are assigned by time of call. Thus, the time of the call must also be determined. If the calling time is between 9 a.m. and 5 p.m., user A will automatically be routed to destination number (303) 441-1111. Such routing is performed transparent to the user without prompting of any kind and without the use of special access codes.

The above described method may be more particularly understood by further reference to the flow diagram of FIG. 5. As illustrated, the method is directed for implementation in a local exchange portion of an Advanced Intelligent Network having a plurality of subscribers. Each of the subscribers are assigned to one of a plurality of predetermined calling groups with each calling group assigned a unique group calling number. Each of the subscribers is further assigned a unique destination number. The method includes generating 48, a call handling request signal representing selected parameters of a call, including the group calling number and a user calling number. The method further includes providing 50 storage means for storing (a) a plurality of user calling numbers and corresponding user location data, and (2) a unique destination number for each subscriber of each calling group and corresponding unique subscriber location data.

In keeping with the invention, the location data may be zip codes, census grid codes or any other suitable information which more particularly defines a geographic area. The call handling request signal is processed 52 to select one of the destination numbers to route the call to. The processing comprises determining 54 the group calling number and corresponding secondary directory from the call handling request signal, determining 56 the user calling number from the call handling request signal, determining 58 the user location data and comparing 60 the user location data to the corresponding subscriber location data of the determined calling group to select the destination number. Thereafter, the call may be routed 62 to the destination number selected. The steps of generating, storing, processing and routing are all performed via components of the above-described Advanced Intelligent Network.

While the best modes for carrying out the invention has been described in detail, those familiar with the art to which this invention relates will recognize various alternative designs and embodiments for practicing the invention as defined by the following claims.

What is claimed is:

1. For use in a local exchange of an Advanced Intelligent Network (AIN) having a plurality of subscribers, each assigned a common non-access code group calling number, an automated system for handling a call made by a user to the common non-access code group calling number without user prompting, the system comprising:

a signal generator integrated with the AIN for generating a call handling request signal representing selected parameters of the call, including a user calling number;

a storage device integrated with the AIN and in communication with the signal generation means for storing (a) a plurality of user calling numbers and corresponding user location data, and (b) a unique subscriber destination number for each of the plurality of subscribers and corresponding unique subscriber location data, said unique subscriber destination numbers corresponding to said common non-access code group calling number; and a processor integrated with the AIN and in communication with the storage device for processing the call handling request signal to select the unique subscriber destination number to route the call to, the processor operative to determine the user calling number from the call handling request signal, and to determine the corresponding user location data, wherein said processor compares the user location data to the subscriber location data to select the unique subscriber destination number and routes the call to the unique subscriber destination number selected.

2. The system of claim 1, wherein the user location data comprises zip code information.

3. The system of claim 1, wherein the user location data comprises census grid code information.

4. For use in a local exchange of an Advanced Intelligent Network (AIN) having a plurality of subscribers, each assigned a common non-access code group calling number, a unique subscriber destination number, and unique zip code data, an automated system for handling a call from a user to the common non-access code group calling number without user prompting, the system comprising:

a signal generator integrated with the AIN for generating a call handling request signal representing selected parameters of the call, including a user calling number;

a storage device integrated with the AIN in communication with the signal generation means for storing (a) a first directory comprising a plurality of user calling numbers, each calling number assigned a corresponding user zip code, and (b) a second directory assigned to said common non-access code group calling number comprising predetermined groups of said unique zip code data, each group assigned a corresponding subscriber destination number;

a processor integrated with the AIN in communication with the storage device for processing the call handling request signal to select the subscriber destination number to route the call to, the processor operative to determine the user calling number from the call handling request signal, wherein said processor compares the user calling number to the first directory to determine the user zip code, compares the user zip code to the second directory to select the corresponding subscriber destination number, and routes the call to the subscriber destination number selected.

5. For use in a local exchange of an Advanced Intelligent Network (AIN) having a plurality of subscribers each assigned a common non-service access code group calling number, a unique subscriber destination number, and unique census grid code data, an automated system for handling a call made by a user to the common non-service access code group calling number without user prompting, the system comprising:

a signal generator for generating a call handling request signal representing selected parameters of the call, including a user calling number;

a storage device in electrical communication with the signal generation means for storing (a) a first directory comprising a plurality of user calling numbers, each calling number assigned a corresponding user census grid code, and (b) a second directory assigned to said common nonservice access code group calling number comprising predetermined groups of said unique census grid code data, each group assigned a corresponding subscriber destination number;

a processor in electrical communication with the storage device for processing the call handling request signal to select the subscriber destination number to route the call to, the processor operative to determine the user calling number from the call handling request signal, wherein said processor compares (i) the user calling number to the first directory to determine the user census grid code, and (ii) the user census grid code to the second directory to select the corresponding subscriber destination number, and routes the call to the subscriber destination number selected, wherein the signal generator storage device, and processor are components of the AIN.

6. For use in a local exchange of an Advanced Intelligent Network (AIN) having a plurality of subscribers, each assigned a common non-special access code group calling number, an automated method for handling a call made by a user to the common non-special access code group calling number without user prompting, the method comprising:

generating a call handling request signal representing selected parameters of the call, including a user calling number;

providing a storage device for storing (a) a plurality of user calling numbers and corresponding location data, and (b) a unique subscriber destination number for each of the plurality of subscribers and corresponding unique subscriber location data, each unique subscriber destination number corresponding to said common non-special access code group calling number; and processing the call handling request signal to select the unique subscriber destination number to route the call to, the processing comprising:

determining the user calling number from the call handling request signal;

determining the corresponding user location data;

comparing the user location data to the subscriber location data to select the unique subscriber destination number; and routing the call to the unique subscriber destination number selected;

wherein generating, storing, processing, and routing are performed via components of the AIN.

7. For use in a local exchange of an Advanced Intelligent Network (AIN) having a plurality of subscribers, each assigned a common non-access code group calling number, a unique subscriber destination number, and unique zip code data, an automated method for handling a call made by a user to the common non-access code group calling number without user prompting, the method comprising:

generating a call handling request signal representing selected parameters of the call, including a user calling number;

providing a storage device for storing (a) a first directory comprising a plurality of user calling numbers, each calling number assigned a corresponding user zip code, and (b) a second directory assigned to the common non-access code group calling number comprising a plurality of predetermined groups of said unique zip code data, each group assigned a corresponding subscriber destination number;

processing the call handling request signal to select the subscriber destination number to route the call to, the processing comprising:

determining the user calling number from the call handling request signal;

comparing the user calling number to the first directory to determine the user zip code; and comparing the user zip code to the second directory to select the corresponding subscriber destination number;

routing the call to the subscriber destination number selected;

wherein generating, storing, processing, and routing are performed via components of the AIN.

8. For use in a local exchange of an Advanced Intelligent Network (AIN) having a plurality of subscribers each assigned a common non-access code group calling number, a unique subscriber destination number, and unique census grid code data, an automated method for handling a call made by a user to the common non-access code group calling number without user prompting, the method comprising:

> generating a call handling request signal representing selected parameters of the call, including a user calling number;
> 
> providing storage means for storing (a) a first directory comprising a plurality of user calling numbers, each calling number assigned a corresponding census grid code, and (b) a second directory assigned to the common non-access code group calling number comprising predetermined groups of said unique census grid code data, each of the groups of said unique census grid code data assigned a corresponding subscriber destination number;
> 
> processing the call handling request signal to select the subscriber destination number to route the call to, the processing comprising:
> 
>> determining the user calling number from the call handling request signal;
>> 
>> comparing the user calling number to the first directory to determine the user census grid code; and
>> 
>> comparing the user census grid code to the second directory to select the corresponding subscriber destination number;
>> 
>> routing the call to the subscriber destination number selected;
> 
> wherein generating, storing, processing, and routing are performed via components of the AIN.

9. For use in a local exchange of an Advanced Intelligent Network (AIN) having a plurality of subscribers, each assigned a common non-access code group calling number, an automated method for handling a call made by a user to the common non-access code group calling number without user prompting, the method comprising:

> generating a call handling request signal representing selected parameters of a call, including a user calling number;
> 
> providing a database for storing (a) a plurality of user calling numbers and corresponding user location data, and (b) a unique subscriber destination number for each of the subscribers and corresponding unique subscriber location data indexed by day and time, wherein each of said unique subscriber destination numbers corresponds to said common non-access code group calling number; and
> 
> processing the call handling request signal to select one of the subscriber destination numbers to route the call to, the processing means comprising:
> 
>> determining the user calling number from the call handling request signal;
>> 
>> determining the user location data and the day and time of the call;
>> 
>> comparing the user location data to the subscriber location data to select the destination number; and
>> 
>> routing the call to the destination number selected;
> 
> wherein generating, storing, processing, and routing are performed via components of the AIN.

10. For use in a local exchange of an Advanced Intelligent Network (AIN) having a plurality of subscribers, each of the subscribers assigned to one of a plurality of predetermined calling groups assigned a unique non-access code group calling number, an automated system for handling a call made by a user to the unique non-access code group calling number without user prompting, the system comprising:

> a signal generator for generating a call handling request signal representing selected parameters of the call, including the unique non-access code group calling number and a user calling number;
> 
> a storage device operative in the AIN and in communication with the signal generator for storing (a) a plurality of user calling numbers and corresponding user location data, and (b) a unique subscriber destination number for each of the plurality of subscribers having a unique non-access code calling group number and corresponding unique subscriber location data; and
> 
> a processor operative in the AIN and in electrical communication with the storage device for processing the call handling request signal to select the unique subscriber destination number to which to route the call, the processor operative to determine the non-access code group calling number and corresponding calling group from the call handling request signal, and to determine the user calling number and corresponding user location data from the call handling request signal, wherein said processor
> 
>> compares the determined user location data to the corresponding unique subscriber location data of the determined calling group to select the unique subscriber destination number; and
>> 
>> routes the call to the selected unique subscriber destination number.

11. For use in a local exchange of an Advanced Intelligent Network (AIN) having a plurality of subscribers, each of the subscribers assigned a unique destination number and further assigned to one of a plurality of predetermined calling groups, each calling group assigned a unique non-access code group calling number, an automated system for handling a call made by a user to the common non-access code group calling number without user prompting, the system comprising:

> a signal generator for generating a call handling request signal representing selected parameters of the call, including the non-access code group calling number and a user calling number;
> 
> a storage device in electrical communication with the signal generator for storing (a) a primary directory comprising a plurality of user calling numbers, each user calling number assigned a corresponding user zip code, and (b) a plurality of secondary directories, each of the secondary directories assigned one of the unique non-access code group calling numbers and comprising predetermined groups of unique zip code data, each of the groups of unique zip code data assigned one or more corresponding subscriber destination numbers;
> 
> a processor in electrical communication with the storage device for processing the call handling request signal to select the corresponding subscriber destination number to route the call to, the processor operative to determine the group calling number and a corresponding one of the plurality of secondary directories from the call handling request signal, and to determine the user calling number from the call handling request signal, wherein the processor
> 
>> compares the user calling number to the primary directory to determine the corresponding user zip code,
>> 
>> compares the user zip code to the determined secondary directory to select the corresponding subscriber destination number, and routes the call to the corresponding subscriber destination number selected;

wherein the signal generator, storage device, and processor are components of the AIN.

12. For use in a local exchange of an Advanced Intelligent Network (AIN) having a plurality of subscribers, each of the subscribers assigned a unique subscriber destination number and further assigned to one of a plurality of predetermined calling groups, each of the plurality of predetermined calling groups further assigned a unique non-access code group calling number, an automated system for handling a call made by a user to the unique non-access code group calling number without user prompting, the system comprising:

a signal generator for generating a call handling request signal representing selected parameters of the call, including the non-access code group calling number and a user calling number;

a storage device in electrical communication with the signal generator for storing (a) a primary directory comprising a plurality of user calling numbers, each of the plurality of user calling numbers assigned a corresponding census grid code, and (b) a plurality of secondary directories, each of the plurality of secondary directories assigned one of the unique non-access code group calling numbers and comprising predetermined groups of unique census grid code data, each group of unique census grid code data assigned one or more unique subscriber destination numbers;

a processor in electrical communication with the storage device for processing the call handling request signal to select one of the unique subscriber destination numbers to route the call to, the processor operative to determine the unique group calling number and corresponding secondary directory from the call handling request signal, and to determine the user calling number from the call handling request signal, wherein the processor compares the user calling number to the primary directory to determine the user census grid code, and compares the user census grid code to the determined secondary directory to select the corresponding subscriber destination number, and routes the call to the subscriber destination number selected;

wherein the signal generator, storage device, and processor are components of the AIN.

13. For use in a local exchange of an Advanced Intelligent Network (AIN) having a plurality of subscribers, each of the subscribers assigned to one of a plurality of predetermined calling groups and each calling group assigned a unique non-access code group calling number, an automated method for handling a call made by a user to the unique non-access code group calling number without user prompting, the method comprising:

generating a call handling request signal representing selected parameters of a call, including the non-access code group calling number and a user calling number;

providing a storage device for storing (a) a plurality of user calling numbers and corresponding user location data, and (b) a unique subscriber destination number for each subscriber of each calling group and corresponding unique subscriber location data; and processing the call handling request signal to select the subscriber destination number to route the call to, the processing comprising:

determining the group calling number, calling group, and corresponding subscriber location data from the call handling request signal;

determining the user calling number and corresponding user location data from the call handling request signal;

comparing the determined user location data to the corresponding subscriber location data of the determined calling group to select the subscriber destination number; and routing the call to the subscriber destination number selected;

wherein generating, storing, processing, and routing are performed via components of the AIN.

14. For use in a local exchange of an Advanced Intelligent Network (AIN) having a plurality of subscribers, each of the subscribers assigned a unique subscriber destination number and further assigned to one of a plurality of predetermined calling groups, each calling group assigned a unique non-access code group calling number, an automated method for handling a call made by a user to the common non-access code group calling number without user prompting, the method comprising:

generating a call handling request signal representing selected parameters of the call, including the non-access code group calling number and a user calling number;

providing storage means for storing (a) a primary directory comprising a plurality of user calling numbers, each user calling number assigned a corresponding user zip code, and (b) a plurality of secondary directories, each of the secondary directories assigned one of the non-access code group calling numbers and comprising predetermined groups of unique zip code data, each group of unique zip code data assigned one or more subscriber destination numbers;

processing the call handling request signal to select one of the subscriber destination numbers to route the call to, the processing comprising:

determining the non-access code group calling number, calling group, and corresponding secondary directory from the call handling request signal;

determining the user calling number from the call handling request signal;

comparing the user calling number to the primary directory to determine the user zip code; and comparing the determined user zip code to the determined secondary directory to select the corresponding subscriber destination number;

routing the call to the subscriber destination number selected;

wherein generating, storing, processing, and routing are performed via components of the AIN.

15. For use in a local exchange of an Advanced Intelligent Network (AIN) having a plurality of subscribers, each of the subscribers assigned a unique subscriber destination number and further assigned to one of a plurality of predetermined calling groups, each calling group further assigned a unique non-access code group calling number, an automated method for handling a call made by a user to the common non-access code group calling number without user prompting, the method comprising:

generating a call handling request signal representing selected parameters of the call, including the non-access code group calling number and a user calling number;

providing storage means for storing (a) a primary directory comprising a plurality of user calling numbers, each user calling number assigned a corresponding census grid code, and (b) a plurality of secondary directories, each of the secondary directories assigned one of the non-access code group calling numbers and comprising predetermined groups of unique census grid code data, each group of unique census grid code data assigned one or more subscriber destination numbers;

processing the call handling request signal to select one of the subscriber destination numbers to route the call to, the processing comprising:

determining the non-access code group calling number, calling group and corresponding secondary directory from the call handling request signal;

determining the user calling number from the call handling request signal;

comparing the user calling number to the primary directory to determine the user census grid code; and comparing the user census grid code to the determined secondary directory to select the corresponding subscriber destination number;

routing the call to the subscriber destination number selected;

wherein generating, storing, processing, and routing are performed via components of the AIN.

16. For use in a local exchange of an Advanced Intelligent Network (AIN) having a plurality of subscribers, each assigned a common group calling number, an automated system for handling a call made by a user to the common group calling number without user prompting or a special access code, the system comprising:

a Service Switching Point (SSP) for generating a call handling request signal representing selected parameters of the call, including a user calling number;

a database in electrical communication with the SSP for storing (a) a plurality of user calling numbers and corresponding user location data, and (b) a unique subscriber destination number for each of the plurality of subscribers and corresponding unique subscriber location data, each unique subscriber destination number corresponding to said common group calling number;

a Service Control Point (SCP) in electrical communication with the database for processing the call handling request signal to select the subscriber destination number to route the call to by determining the user calling number and the user location data from the call handling request signal, whereby the user location data is compared to the subscriber location data to select the subscriber destination number; and a Service Transfer Point (STP) for routing the call to the subscriber destination number selected;

wherein the SSP, database, SCP, and STP are components of the AIN.

* * * * *